US010053308B2

(12) United States Patent
Toews et al.

(10) Patent No.: US 10,053,308 B2
(45) Date of Patent: Aug. 21, 2018

(54) PORTABLE DRIVE-OVER CONVEYOR FOR UNLOADING TRUCKS

(71) Applicant: Convey-All Industries Inc., Winkler (CA)

(72) Inventors: Carl Toews, Winkler (CA); Ed Wiebe, Winkler (CA)

(73) Assignee: Convey-All Industries Inc., Winkler (CA)

( * ) Notice: Subject to any disclaimer, the term of this patent is extended or adjusted under 35 U.S.C. 154(b) by 0 days.

(21) Appl. No.: 14/463,852

(22) Filed: Aug. 20, 2014

(65) Prior Publication Data
US 2016/0052732 A1    Feb. 25, 2016

(51) Int. Cl.
| B65G 65/02 | (2006.01) |
| B65G 65/06 | (2006.01) |
| B65G 67/24 | (2006.01) |
| B65G 47/18 | (2006.01) |
| E01C 19/48 | (2006.01) |

(52) U.S. Cl.
CPC ............ *B65G 67/24* (2013.01); *B65G 47/18* (2013.01); *E01C 19/48* (2013.01)

(58) Field of Classification Search
CPC ................................ B65G 65/02; B65G 65/06
USPC ......... 198/311, 550.01, 550.3; 414/347, 353, 414/376, 389, 393, 398, 528, 574, 577
See application file for complete search history.

(56) References Cited

U.S. PATENT DOCUMENTS

| 4,669,674 | A | * | 6/1987 | Oldengott et al. ....... 241/101.71 |
| 4,881,691 | A | * | 11/1989 | Oldengott et al. ......... 241/101.5 |
| 5,297,914 | A | * | 3/1994 | Ash .............................. 414/574 |
| 5,964,566 | A | | 10/1999 | Stewart |
| 6,238,162 | B1 | * | 5/2001 | Mayer et al. ................. 414/346 |
| 6,966,740 | B2 | * | 11/2005 | Mast et al. .................... 414/537 |
| 7,090,066 | B2 | | 8/2006 | Kirsch |
| 7,424,943 | B2 | | 9/2008 | Gausman |
| 7,607,529 | B2 | * | 10/2009 | Gausman et al. ............ 198/311 |
| 9,701,481 | B2 | * | 7/2017 | Wilcox ............... B65G 41/002 |
| 9,884,731 | B2 | * | 2/2018 | Wilcox ............... B65G 41/008 |
| 2003/0170103 | A1 | | 9/2003 | Mast |

* cited by examiner

Primary Examiner — Douglas A Hess
(74) Attorney, Agent, or Firm — McKee, Voorhees & Sease, PLC

(57) ABSTRACT

A drive-over conveyor for unloading fracking sand is designed to be towed as a highway semi-trailer includes a center frame structure containing a conveyor belt with two pivotal ramps on each side to be moved to a raised position standing upwardly and a lowered position extending outwardly. The ramps have sufficient length and the center structure has a low height to allow a highway semi-trailer to pass over a grate in the center structure. A platform is attached at the forward end with a king pin on the underside for engaging a towing platform of a highway tractor. A wheel and axle assembly including suspension of the axle for highway travel is mounted on a sub-frame pivotal relative to main rear frame for movement relative to the center frame structure from a lowered road position to a raised position allowing the center frame structure to rest on the ground.

20 Claims, 7 Drawing Sheets

PORTABLE DRIVE-OVER CONVEYOR FOR UNLOADING TRUCKS

This invention relates to a portable drive-over conveyor for unloading trucks.

BACKGROUND OF THE INVENTION

Material transport vehicle unloading conveyor systems are commonly used whenever there is a need to transport and store materials at a variety of locations. For example, the agricultural and aggregate industries use unloading conveyor systems to transport and unload various materials.

The present invention provides an arrangement which is particularly but not exclusively designed for unloading sand from highway trucks for movement to a storage silo for use in fracking rather than from agricultural vehicles. The arrangement is designed specifically for movement along highways at highway speeds rather than over agricultural land.

A number of prior art arrangements have been provided, which are primarily designed for agricultural use, as set out for example in the following documents:

U.S. Pat. No. 5,964,566 (Stewart) issued Oct. 12, 1999 and assigned to Sudenga shows a drive over arrangement which uses a chain and paddles as the conveyor and provides a removal wheel system at one end and a pivotal hitch at the other. This is for field use and is not designed for highway transport.

USA 2003/0170103 (Mast) published Sep. 11, 2003 shows a drive over arrangement which uses grain auger where there is includes hydraulic front and rear lifts arrangements for transport. Again this is for field use and is not designed for highway transport.

U.S. Pat. No. 7,090,066 (Kirsch) issued Aug. 15, 2006 and assigned to Bourgault shows a drive over arrangement which uses an auger as the conveyor and provides a retractable wheel system at one end and a pivotal hitch at the other. This is again for field use and is not designed for highway transport.

U.S. Pat. No. 7,424,943 (Gausman) issued Sep. 16, 2008 and assigned to Superior Industries shows a drive over arrangement which uses a belt as the conveyor and provides a pair of fold down ramp sides which are designed to work with an earthen ramp laid on the ground. Also the ramp sides extend across the full width of the unloading vehicle and include side walls to catch material not entering the grate and are arranged to fold up to dump material excess into the grate if the material escapes to either side. This again is for field use and is not designed for highway transport.

SUMMARY OF THE INVENTION

According to the invention there is provided a portable drive-over conveyor for unloading particulate material from trucks comprising:

a center frame structure having a forward end, a rearward end and first and second sides;

a first ramp assembly mounted on the first side for pivotal movement about an axis longitudinal of the first side from a raised position standing upwardly from the first side to a lowered position extending outwardly from the first side to define a ramp allowing a truck wheel to move from the ground onto the center frame structure;

a second ramp assembly mounted on the second side for pivotal movement about an axis longitudinal of the second side from a raised position standing upwardly from the second side to a lowered position extending outwardly from the second side to define a ramp allowing a truck wheel to move from the ground onto the center frame structure;

a conveyor arranged along the center frame structure and arranged to transport the particulate material longitudinally along the center frame structure to a discharge at one end of the center frame structure;

the ramp assemblies and the center frame structure providing upper surfaces for supporting the truck as it passes from the first ramp assembly over the center frame structure and onto the second ramp assembly;

the upper surface of the center frame structure having a grate for passage of the particulate material discharged thereon through the upper surface to the conveyor belt;

a frame component attached to the center frame structure at the forward end so as to extend forwardly therefrom and including a king pin depending from an underside of the frame component for engaging a towing platform of a highway tractor;

and a wheel and axle assembly attached to the center frame structure at the rearward end so as to extend rearwardly therefrom;

the wheel and axle assembly being mounted for movement relative to the center frame structure from a lowered road position to a raised position allowing the center frame structure to rest on the ground;

the wheel and axle assembly including suspension of an axle of the wheel and axle assembly arranged for highway travel.

Preferably the frame component at the forward end comprises a platform generally parallel to the center frame structure at a height raised from the center frame structure. Preferably the platform carries drive components for the conveyor. Preferably the platform is cantilevered forwardly from the center frame structure with the king pin is mounted underneath the platform and extending downwardly therefrom. Thus the platform can extend over the conventional towing plate of a highway tractor with the center frame structure located behind and below the platform.

Preferably the frame component includes vertically sliding legs with bottom feet which can be moved from a raised position in which the center frame structure rests on the ground to a lowered position in which the center frame structure is raised from the ground and the towing platform of a highway tractor can move underneath the king pin. Thus the platform remains in a position parallel to the center frame structure and does not pivot with the legs being used to lift the platform off the towing vehicle and then to lower the center frame structure to the ground.

Preferably there is provided a rear frame structure extending rearwardly from the center frame structure at a position thereon raised from a bottom of the center frame structure and carrying an upwardly and rearwardly extending portion of the conveyor and the wheel and axle assembly includes a frame which is connected to the rear frame structure for pivotal movement about a transverse axis from the lowered road position to the raised position. That is the center frame structure is lowered to the ground by tilting the frame carrying the wheels upwardly to a position where the wheels are lifted from the ground.

Preferably the frame of the wheel and axle assembly includes a pair of parallel beams each mounted inwardly of a respective one of a pair of parallel beams of the rear frame structure and there is provided a locking pin extending transversely of the frame of the wheel and axle assembly and arranged to lock the frame to the rear frame structure.

Preferably the highway suspension which includes conventional gas bag springs is connected between the wheel and axle assembly and the frame.

Preferably each of the ramp assemblies comprises a pair of parallel ramp members which are spaced apart so that any material which misses the grate cannot be caught on the ramps since it will fall between the ramps. Thus the grate is substantially equal in width to a space between the ramp members.

Preferably each of the ramp assemblies tapers to an outer ramp edge so that there is no need or possibility for an earthen ramp section leading up the ramp edge. Preferably a length between the outer ramp edge of the first ramp assembly and the outer ramp edge of the second ramp assembly is at least 25 feet. Preferably the center frame structure has a height to the upper surface which is of the order of or less than 12 inches. This combination of dimensions allows a highway semi-trailer truck with a belly discharge opening which is relatively close to the ground and located between the wheels of the tractor and the wheels of the trailer to drive over the ramp without grounding out the trailer. Of course agricultural vehicles have a much higher clearance and hence can negotiate much higher ramps without difficulty.

Preferably the upper surface of the center frame structure has on each side of the grate a respective ramp portion inclined downwardly and outwardly and having an outer edge contiguous with an inner edge of the respective ramp assembly. That is the grate forms a relatively small area of the upper surface of the center section.

Preferably the center frame structure includes for each ramp assembly an outwardly extending shoulder on which the inner edge of the respective ramp assembly sits so that the significant loading from the weight of the vehicle can be transferred from the inner end of the ramp sitting on the shoulder into the center section which sits on the ground.

Preferably the conveyor includes a belt which has an upper run underneath the grate which sits on a support surface carried by the center frame structure where the support surface is downwardly concave and the support surface carries a plurality of stationary strips of a plastics bearing material on which the upper run of the belt slides. This allows the structure to have a very low profile allowing the above total height of the center section from the ground to the grate to be of the order of 12 inches to accommodate highway trucks. Also a return run of the belt slides preferably on a bottom support surface on which is provided a plurality of stationary strips of a plastics bearing material on which the return run of the belt slides

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

The arrangement shown herein provides a portable drive-over conveyor 10 for unloading particulate material from trucks and includes a center frame structure 11 a first ramp assembly 12 on one side and a second ramp assembly 13 on the second side so that the truck to be unloaded can drive over the apparatus entering from one ramp, halting with the discharge of the truck at the center section and then departing over the second ramp.

Figure 6:
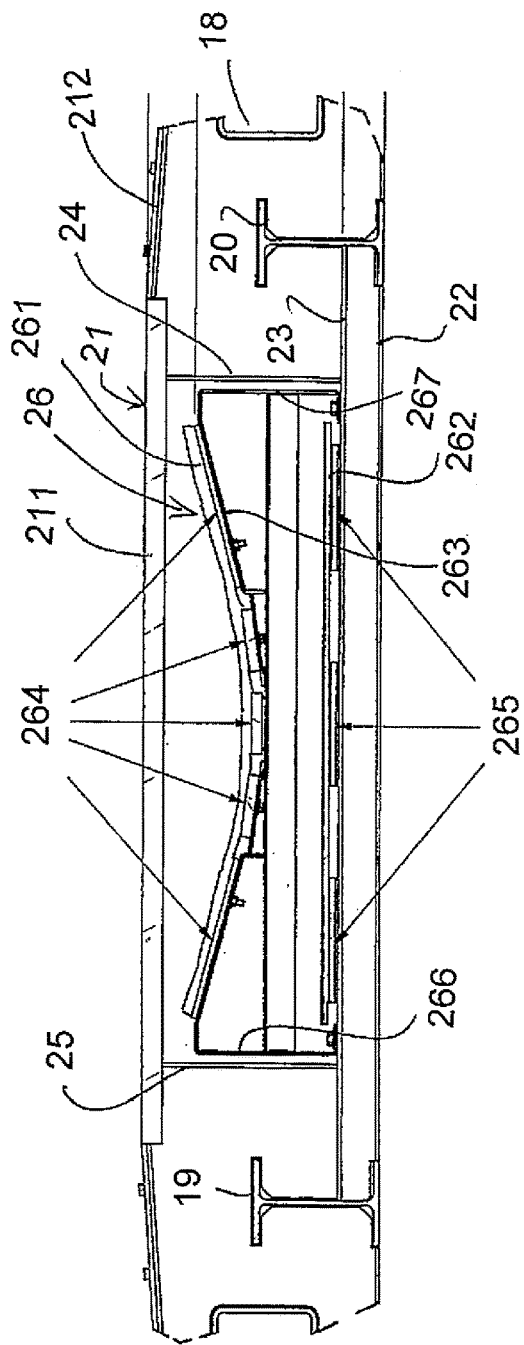
FIG. 6 is part only of the cross sectional view of FIG. 5 on an enlarged scale showing the conveyor.
Figure 7:
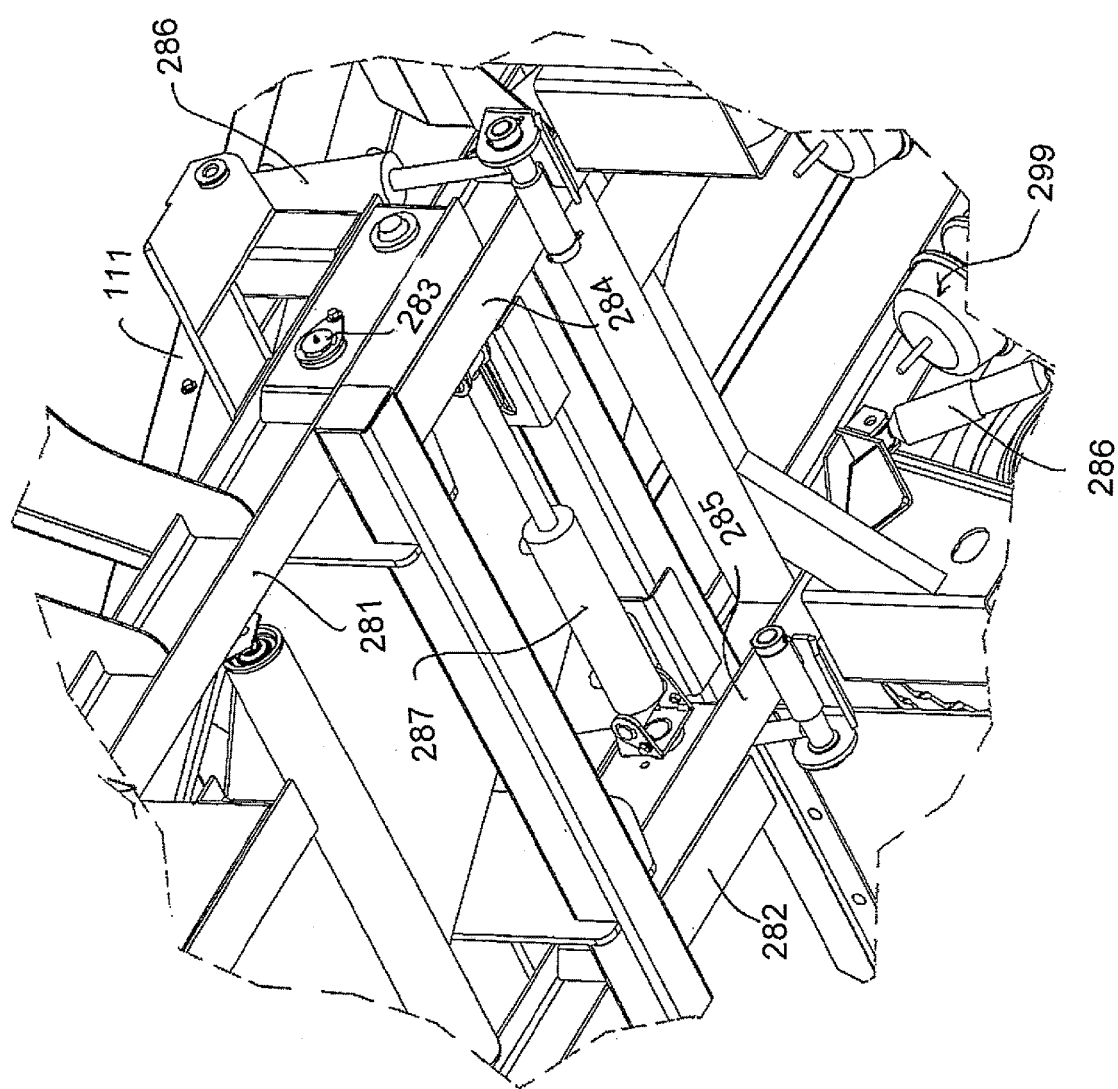
FIG. 7 is an isometric view from underneath of the rear section only of the embodiment of FIG. 1
Figure 9:
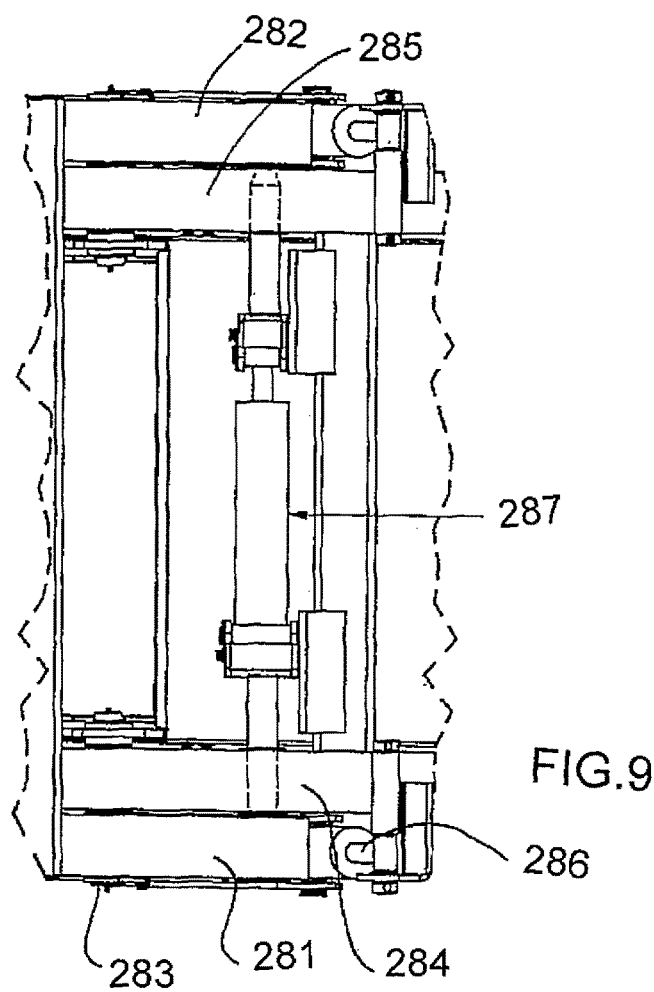
FIG. 9 is a side view of a part only of the rear section of FIG. 7.
Figure 8:
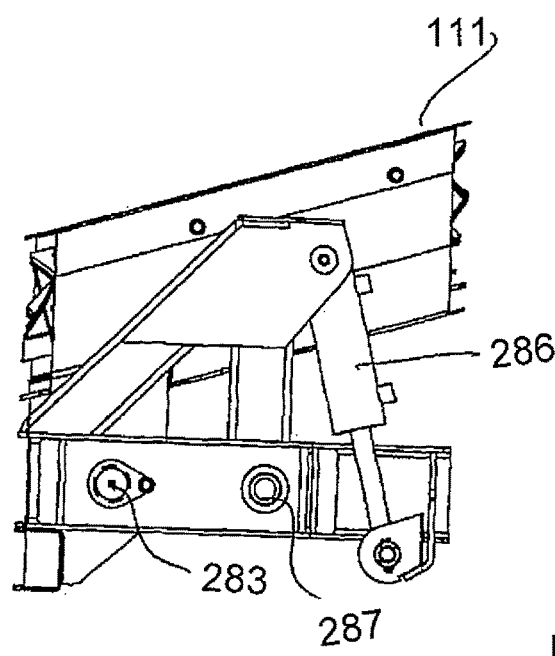
FIG. 8 is a plan view of a part only of the rear section of FIG. 7.
Figure 10:
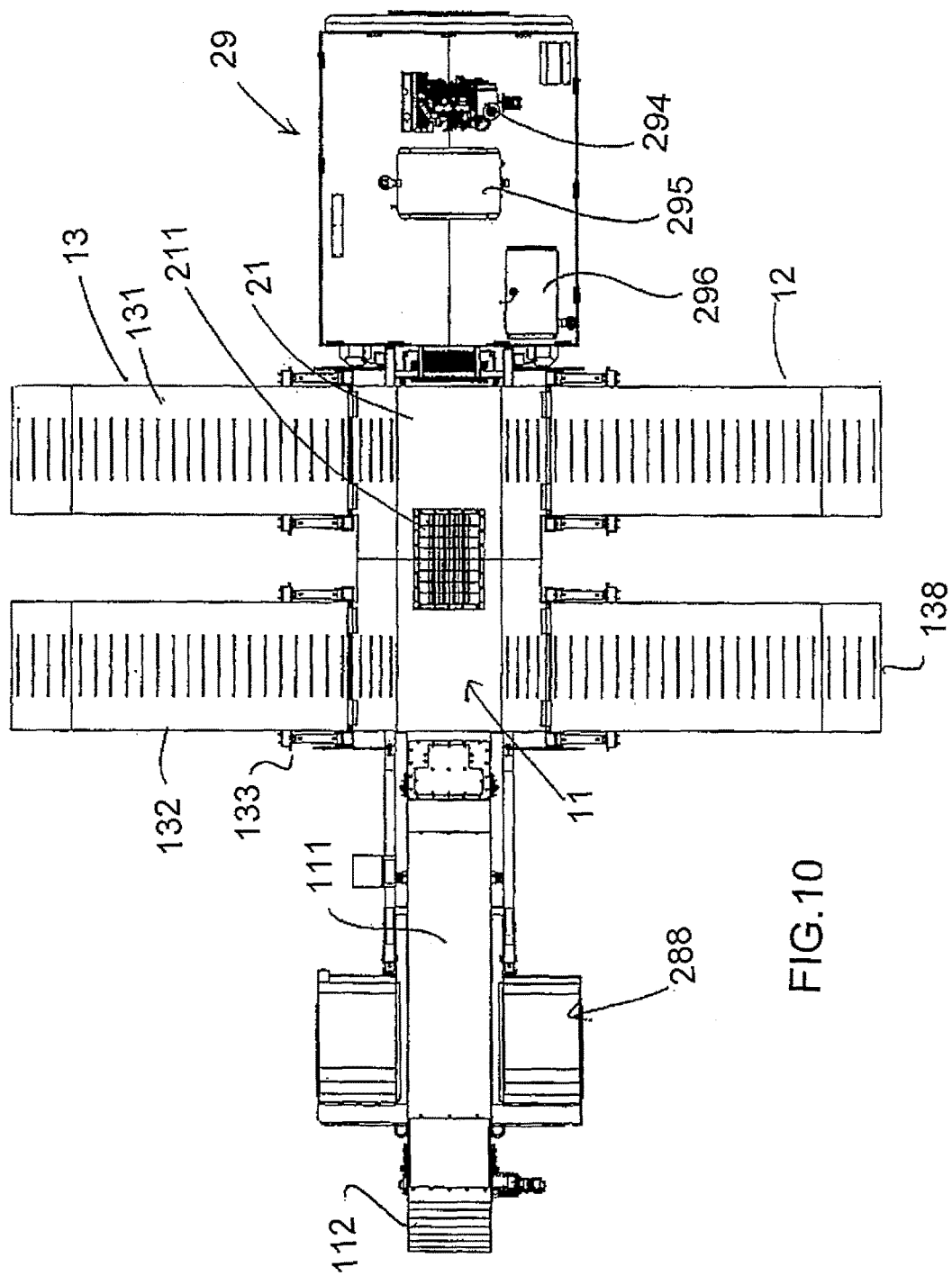
FIG. 10 is a top plan view of the embodiment of FIG. 1.

The center frame structure has a forward end 15, a rearward end 16 and first and second sides 17, 18. The center frame structure includes a pair of longitudinal beams 19, 20 forming the main structural components, an upper support surface 21 and a bottom cover panel 22. The panel 22 sits on the ground during operation and the beams support the top surface 21 on a transverse wall 23 and upstanding walls 24, 25 (FIG. 6). The top support surface 21 extends along the full length of the center section.

The first and second ramp assemblies 12, 13 are symmetrically mounted on the respective side 18 for pivotal movement about an axis 181 longitudinal of the first side 18 (or second side 17) from a raised position standing vertically upwardly above the first side 18 for transport of the apparatus from place to place. When delivered to a required location, the ram assemblies are lowered to an operating position extending outwardly from the respective side as shown in the Figures to define a ramp allowing a truck wheel to move from the ground onto the center frame structure for the delivery process.

Each ramp assembly comprises two side by side parallel ramps 131 and 132 which can be raised and lowered by cylinders 133 at sides of the ramps.

Each ramp includes an inclined upper surface 135 attached at its edges to two triangular sides 137 which attach also to a bottom wall 136 which sits on the ground and transfers loads from the vehicle to the ground from the upper surface 135. The upper surface and the bottom surface converge to an edge 138 at the outer end of the ramp which is sufficiently sharp to allow the vehicle wheel to enter onto the ramp without the necessity for an earthen ramp beyond the edge 138. The ramps and the center frame structure thus provide upper surfaces for supporting the truck as it passes from the first ramp over the center frame structure and onto the second ramp. The ramps 131, 132 are spaced along the side edges of the center section by a space 139 so that any material from the vehicle which does not enter onto the center section for conveying falls to the ground rather than is collected on the ramps.

A conveyor 26 is arranged to extend along the center frame structure 11 and arranged to transport the particulate material longitudinally along the center frame structure 11 up an inclined section 111 of the conveyor to a discharge chute 112 at one end of the center frame structure which is at a rear frame 28 at the rear end 16.

The upper surface 21 of the center frame structure 11 has a central rectangular grate 211 for passage of the particulate material discharged thereon through the upper surface to the conveyor 27. The grate is spaced from the side edges of the upper surface and from the ramps and forms a relatively localized area within the upper surface.

The grate is substantially equal in width to the space 139 between the ramp members so that lifting of the ramps to the raised position does not cause any material to fall from the ramps into the grate. The upper surface of the center frame structure has on each side of the grate a respective ramp portion 212, 213 inclined downwardly and outwardly from the flat upper surface so as to act as a commencement of the ramp which has an outer edge 214 contiguous with an inner edge of the respective ramp assembly.

The center structure 11 has at the front edge 15 a frame component 29 attached to the center frame structure at the forward end so as to extend forwardly therefrom and includes a planar platform 292 generally parallel to the center frame structure at a height raised from the center frame structure. The platform is attached to the center structure by a frame connection which is designed to transfer loads during transport from the center section to the platform so that the platform is cantilevered forwardly from the center frame structure. The platform carries drive components including a motor and together with hydraulic drive systems and control units 295, 296 for the conveyor.

Underneath the platform is provided a king pin 291 depending from an underside of the frame for engaging a towing platform of a highway tractor (not shown).

The frame platform at the frame 293 connecting to the center section carries conventional jacking legs used on semi-trailers to jack to the ground. The legs which can be moved from a raised position in which the center frame structure rests on the ground to a lowered position in which feet of the legs sit on the ground and lift the center frame structure to be raised from the ground and the towing platform of a highway tractor can move underneath the king pin.

The rear frame structure 28 extends rearwardly from the center frame structure at a position thereon raised from a bottom of the center frame structure and carries the upwardly and rearwardly extending portion 111 of the conveyor 11. The rear frame includes a pair of parallel beams 281, 282 connected at a forward end to a frame coupling to the center section to transfer loads therebetween. An inner frame defined by parallel beams 284, 285 located inside the beams 281, 282 is pivotal relative to the outer frame on a transverse pivot pin. The inner frame is pivotal by a drive cylinder 286 and can be locked in a lowered position for transport by a locking pin 297 which drives a pin across aligned holes of the beams. The inner frame carries a wheel and axle assembly 288 for movement relative to the center frame structure and the outer rear frame from a lowered road position to a raised position allowing the center frame structure 11 to rest on the ground. The wheel and axle assembly includes highway tires and a gas bag suspension of the relative to the inner frame which is arranged for highway travel.

Each of the ramp assemblies tapers to the outer ramp edge 138 and a length between the outer ramp edge 138 of the first pair of ramps and the other ramps is at least 25 feet and preferably of the order of 28 feet which combined with a height of the center structure from the ground to the upper surface which is of the order of or less than 12 inches allows conventional belly discharge highway semi-trailers to pass over without grounding out and without requirement for any earthen ramp beyond the edges 138.

Figure 1:
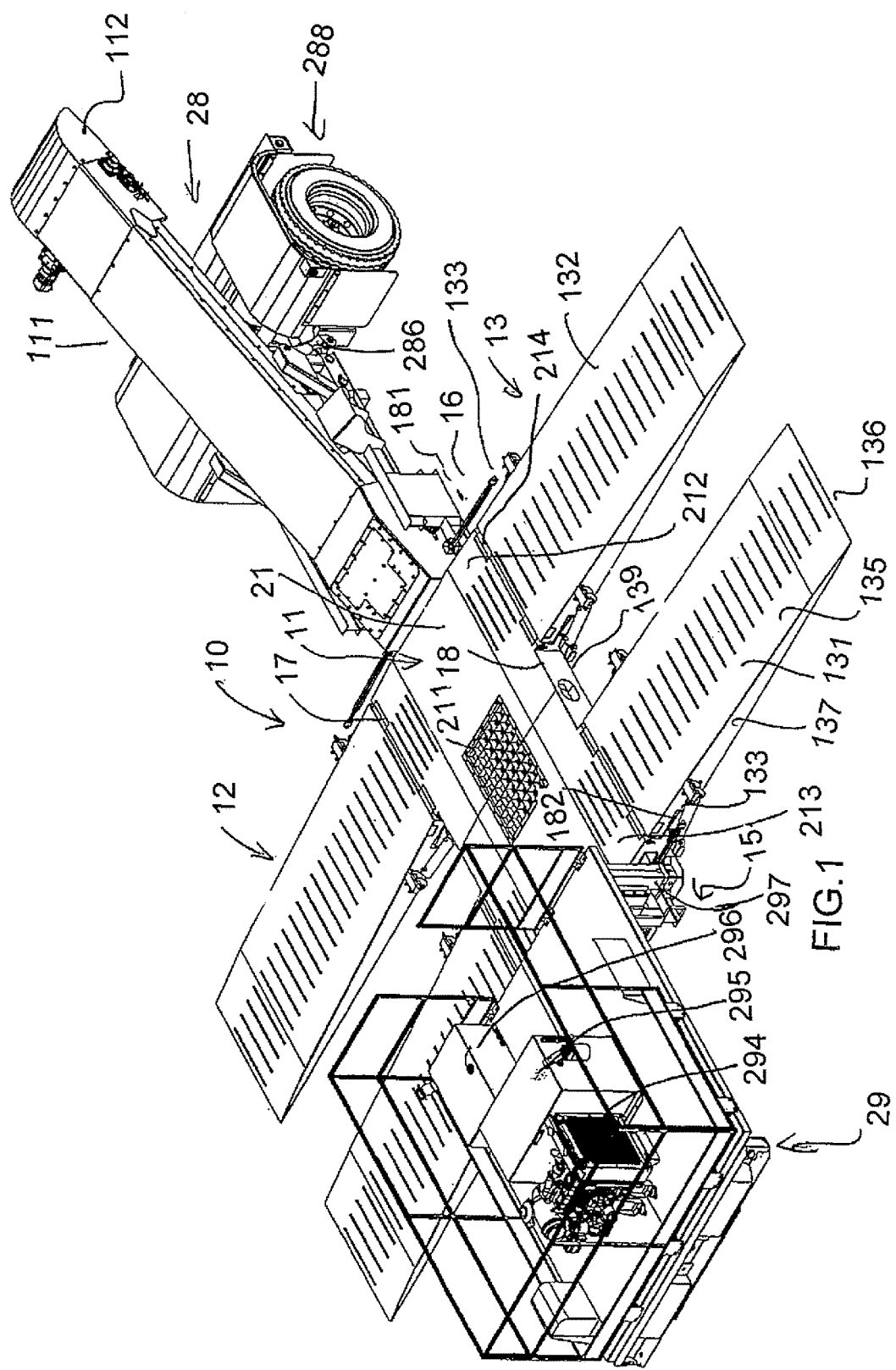
FIG. 1 is an isometric view of a portable drive-over conveyor for unloading trucks according to the present invention.
Figure 2:
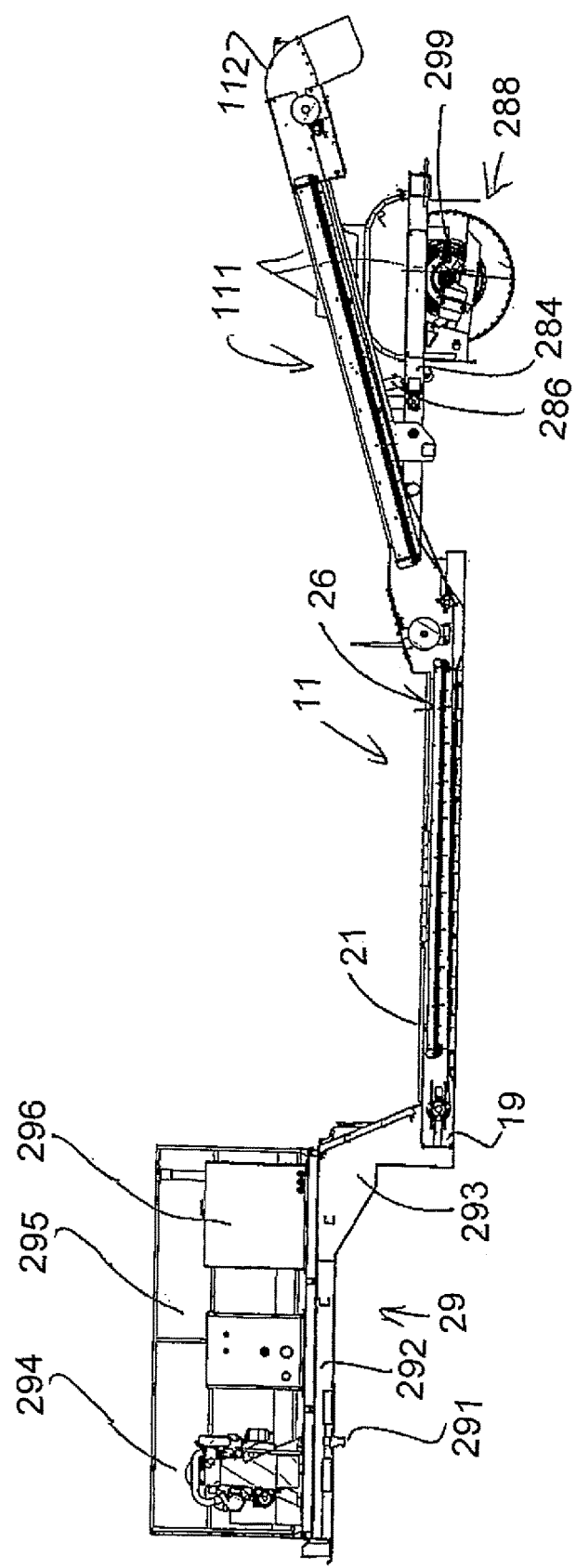
FIG. 2 is a vertical central cross sectional view of the embodiment of FIG. 1.
Figure 4:
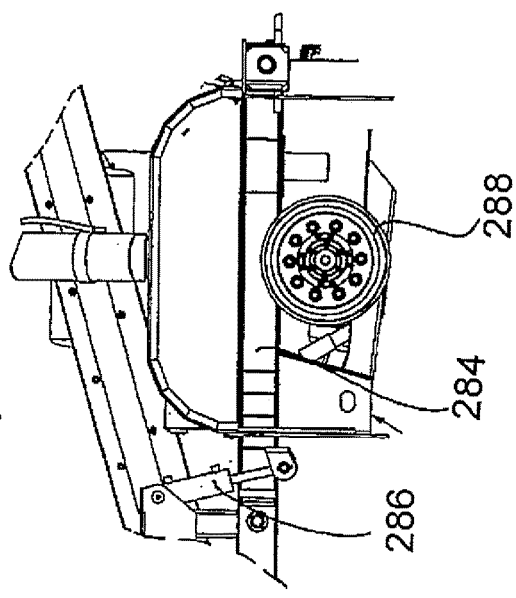
FIG. 4 is part only of the vertical central cross sectional view of FIG. 2 on an enlarged scale showing rear frame and ground wheels.
Figure 3:
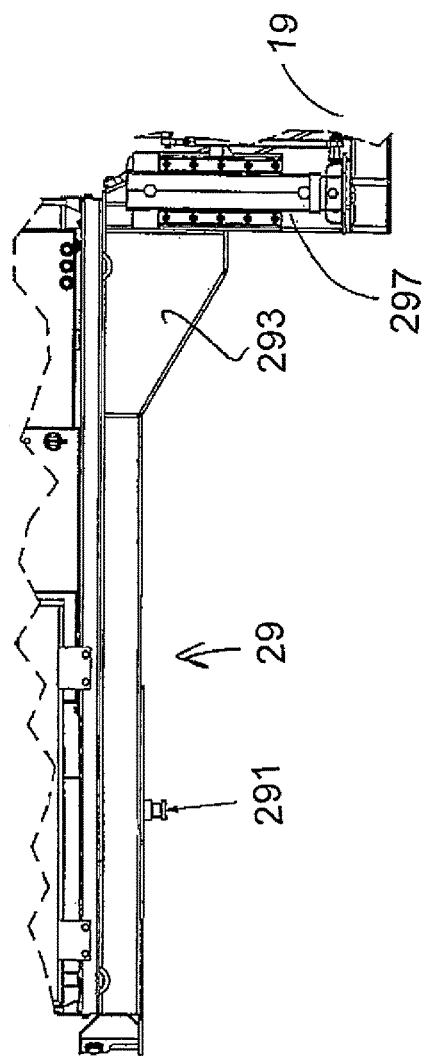
FIG. 3 is a part only of the vertical central cross sectional view of FIG. 2 on an enlarged scale showing the front platform.
Figure 5:
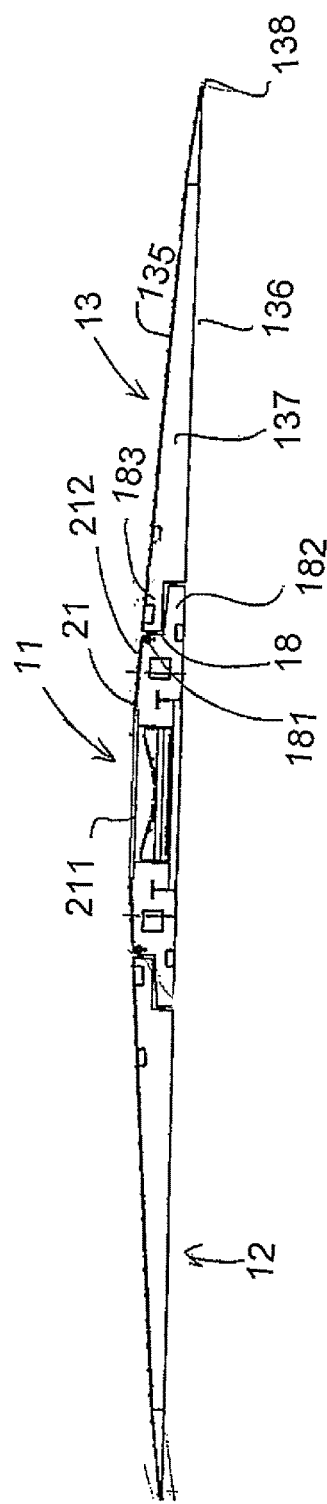
FIG. 5 is transverse cross sectional view of the embodiment of FIG. 1

As shown in FIG. 5, the center frame structure 11 includes for each ramp assembly 12, 13 an outwardly extending shoulder 182 on which the inner edge 183 of the respective ramp assembly sits. This acts to transfer loads form the ramp as the truck passes over from the ramp to the center structure and to reduce loading on the pivot at the axis 181.

As shown in FIG. 6, the conveyor 26 includes a belt 261 which has an upper run underneath the grate 211 which sits on a downwardly concave support surface 263 carried by the center frame structure at the transverse sheet 23 of the beams 19, 20. The support surface 263 carries a plurality of stationary strips 264 of a plastics bearing material on which the upper run of the belt slides. This allows the belt to slide effectively and avoids the increase in height that would in incurred if rollers were used. The concave shape of the belt and support provides space for the sand to enter and be carried on the belt while again avoiding an increase in height of the center section. The return run 262 of the belt slides on a bottom support surface defined by the sheet 23 on which is provided a plurality of stationary strips 265 of the plastics bearing material. The support sheet 263 is carried on upstanding side sheets 266, 267 carried on the sheet 23.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A portable drive-over conveyor for unloading particulate material from trucks comprising:
   a center frame structure having a forward end, a rearward end and first and second sides;
   a first ramp assembly mounted on the first side for pivotal movement about an axis longitudinal of the first side from a raised position standing upwardly from the first side to a lowered position extending outwardly from the first side to define a ramp allowing a truck wheel to move between the ground and the center frame structure;
   a second ramp assembly mounted on the second side for pivotal movement about an axis longitudinal of the second side for pivotal movement about an axis longitudinal of the second side from a raised position standing upwardly from the second side to a lowered position extending outwardly from the second side to define a ramp allowing a truck wheel between the ground and the center frame structure;
   a conveyor arranged along the center frame structure and arranged to transport the particulate material longitudinally along the center frame structure to a discharge at one end of the center frame structure;
   the ramp assemblies and the center frame structure providing upper surfaces for supporting the truck as it passes from the first ramp assembly over the center frame structure and onto the second ramp assembly;
   the upper surface of the center frame structure having a grate for passage of the particulate material discharged thereon through the upper surface to the conveyor belt;
   a frame component attached to the center frame structure at the forward end so as to extend forwardly therefrom and including a king pin depending from an underside of the frame component for engaging a towing platform of a highway tractor;

and a wheel and axle assembly pivotally attached to the center frame structure at the rearward end;

the wheel and axle assembly being mounted for pivotal movement relative to the center frame structure from a lowered road position to a raised position allowing the center frame structure to rest on the ground; and the wheel and axle assembly including suspension of an axle of the wheel and axle assembly arranged for highway travel.

2. The conveyor according to claim 1 wherein the frame component at the forward end comprises a platform generally parallel to the center frame structure at a height raised from the center frame structure.

3. The conveyor according to claim 2 wherein the platform carries drive components for the conveyor.

4. The conveyor according to claim 2 wherein the king pin is mounted underneath the platform.

5. The conveyor according to claim 1 wherein the platform is cantilevered forwardly from the center frame structure.

6. The conveyor according to claim 1 wherein the frame component includes legs which can be moved from a raised position in which the center frame structure rests on the ground to a lowered position in which the center frame structure is raised from the ground and the towing platform of a highway tractor can move underneath the king pin.

7. The conveyor according to claim 1 wherein there is provided a rear frame structure extending rearwardly from the center frame structure at a position thereon raised from a bottom of the center frame structure and carrying an upwardly and rearwardly extending portion of said conveyor and wherein the wheel and axle assembly includes a frame which is connected to said rear frame structure for pivotal movement about a transverse axis from said lowered road position to said raised position.

8. The conveyor according to claim 1 wherein the frame of the wheel and axle assembly includes a pair of parallel beams each mounted inwardly of a respective one of a pair of parallel beams each mounted inwardly of a respective one of a pair of parallel beams of the rear frame structure.

9. The conveyor according to claim 1 wherein there is provided a locking pin extending transversely of the frame of the wheel and axle assembly and arranged to lock the frame to the rear frame structure.

10. The conveyor according to claim 1 wherein the suspension is connected between the wheel and axle assembly and the frame.

11. The conveyor according to claim 1 wherein each of the ramp assemblies comprises a pair of parallel ramp members.

12. The conveyor according to claim 11 wherein the grate is substantially equal in width to a space between the ramp members.

13. The conveyor according to claim 1 wherein each of the ramp assemblies tapers to an outer ramp edge and wherein a length between the outer ramp edge of the first ramp assembly and the outer ramp edge of the second ramp assembly is at least 25 feet.

14. The conveyor according to claim 1 wherein the center frame structure has a height to the upper surface which is of the order of or less than 12 inches.

15. The conveyor according to claim 1 wherein the upper surface of the center frame structure has on each side of the grate a respective ramp portion inclined downwardly and outwardly and having an outer edge contiguous with an inner edge of the respective ramp assembly.

16. The conveyor according to claim 15 wherein the center frame structure includes for each ramp assembly an outwardly extending shoulder on which the inner edge of the respective ramp assembly sits.

17. The conveyor according to claim 1 wherein the conveyor includes a belt which has an upper run underneath the grate which sits on a support surface carried by the center frame structure.

18. The conveyor according to claim 17 wherein the support surface is downwardly concave.

19. The conveyor according to claim 17 wherein the support surface carries a plurality of stationary strips of a plastics bearing material on which the upper run of the belt slides.

20. The conveyor according to claim 17 wherein a return run of the belt slides on a bottom support surface on which is provided a plurality of stationary strips of a plastics bearing material on which the return run of the belt slides.

* * * * *